United States Patent
Williams

[11] 3,743,461
[45] July 3, 1973

[54] PELLETIZER CONTROL SYSTEM
[75] Inventor: David C. Williams, Columbus, Ohio
[73] Assignee: Ashland Oil, Inc., Ashland, Ky.
[22] Filed: Jan. 3, 1972
[21] Appl. No.: 214,965

Related U.S. Application Data
[62] Division of Ser. No. 655,528, July 24, 1967, Pat. No. 3,657,400, which is a division of Ser. No. 103,925, April 8, 1961, Pat. No. 3,337,907.

[52] U.S. Cl................... 425/148, 425/222, 264/310
[51] Int. Cl.............................................. B29f 5/00
[58] Field of Search........................... 425/222, 148; 264/310

[56] References Cited
UNITED STATES PATENTS
3,056,162  10/1962  Fisher............................ 425/222 X
3,017,662  1/1962   Marsh............................. 425/222 X
3,406,426  10/1968  Pobst, Jr. et al................. 425/222 X Primary Examiner—Robert L. Spicer, Jr.
Attorney—Walter H. Schneider et al.

[57] ABSTRACT

The application discloses an automatic system for the control of pelletizing apparatus in which continuous weighing means (e.g., a weigh belt) are used to generate a signal representative of the weight of a flow of a "loose" powdery solid from a feeder (e.g., feed screw) to a pelletizer in which the solid is mixed with a pelletizing fluid, and the flow of pelletizing fluid into the pelletizer is controlled in accordance with the signal by flow regulating means interconnected with the weighing means.

9 Claims, 1 Drawing Figure

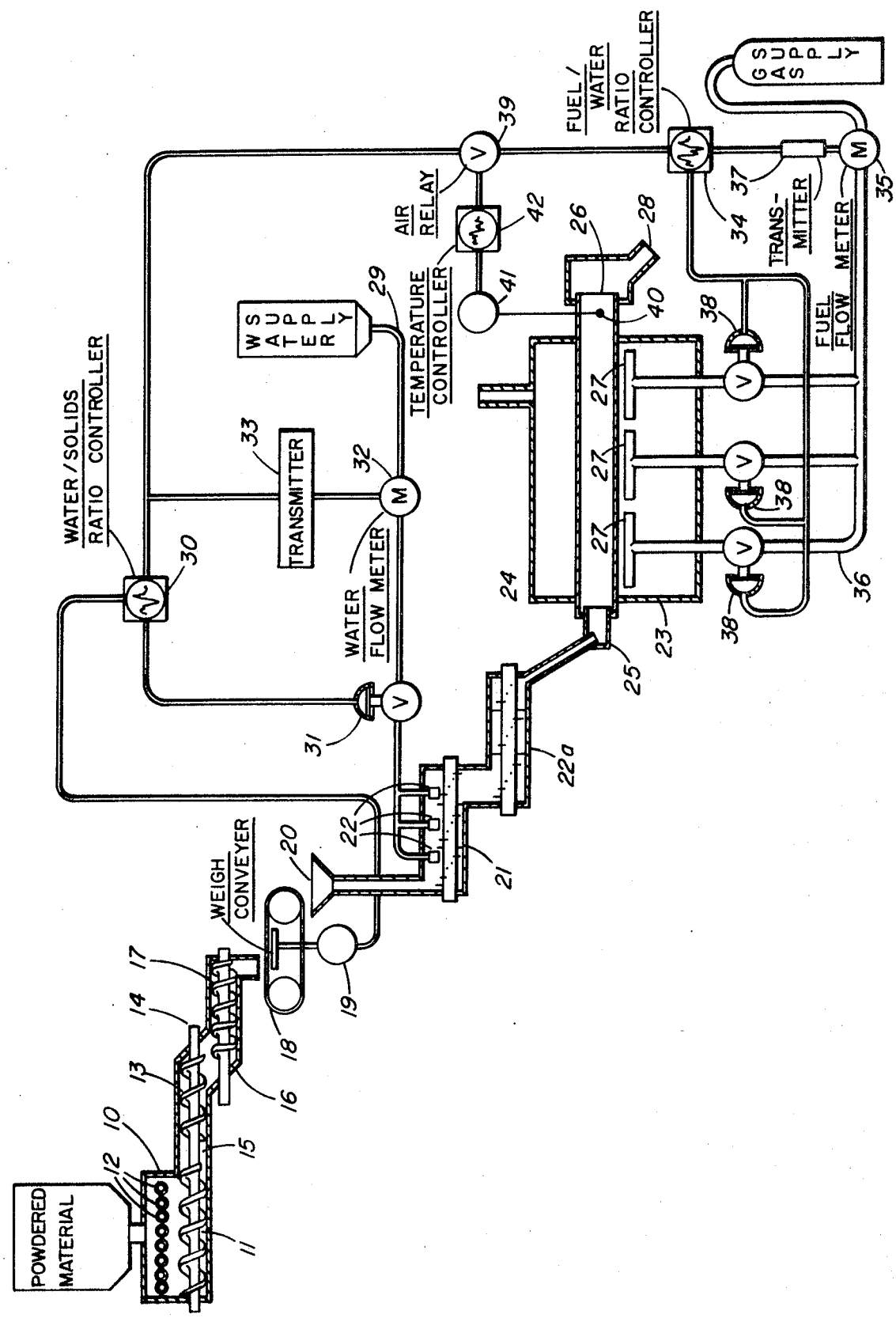

PELLETIZER CONTROL SYSTEM

RELATED APPLICATION

This application is a division of the present inventor's copending application Ser. No. 655,528, filed July 24, 1967, now U.S. Pat. No. 3,657,400, which in turn is a division of the inventor's prior copending parent application Ser. No. 103,925, filed Apr. 8, 1961, now U.S. Pat. No. 3,337,907.

BACKGROUND OF THE INVENTION

It is well known that many materials are handled with greater facility when in agglomerated form as opposed to powdered form. Manufacturers of powdered material have found that the marketability of the powdered material they produce is enhanced by agglomeration because of the desire of many material buyers to purchase it in a form more convenient to handle. Therefore, it has become a common practice to subject such materials to a treatment which is able to build up many small particles of powder into a lesser number of larger aggregates. One method of agglomerating a loose powdery material is to add a liquid to it, so that upon subsequent treatemnt by any of the well-knowm methods for producing agglomerates, such as rolling, tumbling, pelletizing, agitation, granulation, "Spheronizing," extrusion, ect., a dense uniform agglomerate, pellet or granule of the desired size will result. Examples of suitable liquids include oils, water and others. It may also be found desirable to include surfactants along with the liquid. Hereinafter the terms "pelletizing" and "pellet" should be interpreted to encompass any or all of the above-mentioned physical methods of bringing about the intimate compaction of powdery materials in agglomerated form as well as the agglomerated products of any or all of such processes.

The percentage of pelletizing liquid used, based on the amount of powder being treated, is an important factor since the range of liquid content which encourages agglomeration into pellets is somewhat limited. The proportion of pelletizing liquid to be added to a powdery material is determined in part by the kind of material being pelleted, the moisture contact of the powdered material prior to the addition of the pelletizing liquid and the nature of the pelletizing process. Because the range of acceptable liquid content for any given material and process is limited, it has been found necessary, in continuous production processes, for the process operator to maintain continuous surveillance over the rate of liquid addition and to adjust said rate frequently.

SUMMARY OF THE INVENTION

Considerable savings of man power and expense have resulted from the discovery of an effective automatic control system for the addition of the materials to a pelletizing process. The apparatus aspects of the invention include the combination of: feeder means for feeding a flow of powdery solids in an unpelletized form at a relatively smooth volume rate; a weighing device connected to said feeder means and to a pelletizer for continuously receiving and weighing said relatively smooth flow of powdery material while conveying same to the pelletizer, said weighing device including means for producing a weight signal which varies in accordance with and is representative of varying weights of said powdery solids present on the weighing device; a conduit communicating between a source of pelletizing fluid and the interior of said pelletizer for conveying said fluid thereto; valve means in said conduit for regulating the rate of flow of said fluid; and ratio control means connected to said weighing device and to said valve means for receiving weight signals from said weighing device and for opening and closing said valve means in response thereto as the weight of powdery solids on said weighing device varies in order to maintain a predetermined ratio between the flows of powdery solids and pelletizing fluid to the pelletizer.

The process aspects of the present invention includes the combination of: continuously introducing powdery solid material into a feeder means and discharging said powdery solid from said feeder means in an unpelletized state as a relatively smooth flow; conveying said powdery solids from said feeder means to a continuous weighing device and from said weighing device to a pelletizer; continuously weighing the powdery material present on said weighing device and generating a weight signal which varies in accordance with and is representative of varying weights of said powdery material; continuously introducing pelletizing fluid to said pelletizer; and transmitting said weight signal to control means for varying the flow of pelletizing fluid in response thereto to maintain a predetermined ratio between the flows of powdery solids and pelletizing fluid to the pelletizer.

DESCRIPTION OF PREFERRED EMBODIMENTS

Reference is now made to the accompanying drawing, which is a schematic diagram of a specific illustration of the invention. This drawing and the following description are specifically directed to a carbon black pelleting process but it is to be understood that the invention is not limited thereto.

The dry, fluffy product of any well-known method of producing carbon black is introduced into a surge tank 10. The powdery material is then steadily withdrawn, at a rate subject to adjustment, from the surge tank by means of a first screw conveyor 11. In order to prevent bridging of the material within the surge tank and consequent irregularities in its removal therefrom by the conveyer 11, air pads 12 may be utilized to maintain the material in a uniformly fluidized state.

In the screw conveyer 11 a section of the flighting 13 is preferably removed from shaft 14 to leave a portion 15 of said shaft free of flighting. During the operation, the conveyer will become filled or packed at 15 where the flighting has been removed. This is due to the fact that material reaching the shaft portion 15 can only be removed from the area of such shaft portion 15 when sufficient material is available from the surge tank side of the conveyer to push the material at 15 to the point at which the flighting is resumed. Provided that the removed section of flighting is long enough, the material in the area of shaft portion 15 will form a plug of moving material which effectively functions as a seal between the surge tank 10 and the parts of the conveyer to the right of shaft portion 15.

Conveyer 11 discharges through a chute 16 to a second conveyer 17 which transports the solid material at a somewhat faster rate than the conveyer 10 and feeds a relatively smooth flow of carbon black to a weighing device. Any suitable type of weighing device may be employed but we prefer to utilize a weigh belt conveyer 18 which includes a pneumatic air transmitter 19.

The material discharged from the weigh belt conveyer enters the inlet hopper 20 of a suitable mixer 21, such as the pin shaft type pellet mill illustrated. Within the mixer 21 are located one or more spray heads 22 through which the pelletizing liquid can be introduced. In the case of carbon black the pelletizing liquid is usually water, and accordingly water will be referred to as the pelletizing liquid in this example. One or more additional mixing stages, such as in the mixer 22a may be employed if desired. A pelletizer or extruder (not shown) may also be used to process the product of the mixer 22a.

The admixture of carbon black and water may then be fed into a rotating externally fired dryer 23 having a substantially horizontal cylindrical drum 24 which is adapted to rotate about its major axis and to receive the water and carbon black mixture through inlet 25. As the wet carbon black mixture passes from the inlet 25 through the drum 24 to the downstream end 26, the drum is heated externally by heating elements or burners such as the gas burners 27. The temperature and length of treatment of the wet carbon black mixture in the drum are regulated in such a manner as to yield agglomerates, pellets or granules of the desired moisture content. The dried pellets or granules are then discharged from a chute 28 into any suitable conveyer, storage or packaging unit, not shown.

The ratio control system which continuously and automatically regulates the addition of water through the spray heads 22 and water pipe 29 in proportion to the weight of material crossing the weighing conveyer and entering the mixer 21, comprises the following elements: the weigh conveyer 18; linear transmitter 19; water/solids ratio controller 30; motor valve 31 in the water pipe 29; water flow sensing means, such as an orifice meter 32 in water pipe 29; and a transmitter 33 therefor. One input of the water/solids ratio controller 30 is connected to the output of the transmitter 19, which produces a weight signal which is a linear function of the amount of material present in the conveyer 18 at any given moment. The other input of the controller 30 receives a linear water flow signal from transmitter 33. The orifice meter 32 measures the flow in pipe 29 as a differential. Therefore, the transmitter 33 must be of the type which converts a differential input into a linear output. Any suitable type of flow sensing means and transmitter which are capable of being matched with controller 30 may be used. However, we prefer here, as in the case of the weigh conveyer transmitter, to utilize a pneumatic transmitter which transmits a linear signal such as a Bailey-Ledoux-Bell transmitter or the like.

The controller 30, which may be selected from any of those controller-receiver instruments which include ratio control such as the Brown Two-pen pneumatic receiver-recorder, is set so that the signals from the transmitters 19 and 33 are in balance whenever the weight of material on conveyer 18 and the flow in pipe 29 are such that the correct proportions of water and carbon black are combined in the mixer 21. Whenever the selected water to carbon black ratio is upset, the controller 30 causes a change of air pressure to occur over the diaphragm in motor valve 31 to increase or decrease the flow of fluid in pipe 29 until the signals from transmitters 19 and 33 are again in the correct proportional balance.

As varying amounts of carbon black enter the mixer 21, an automatically regulated proportional amount of water is added thereto through spray heads 22. During the course of normal operations the rate of carbon black addition and consequently the ratio of water addition will fluctuate sufficiently so that alterations must be made from time to time in the dryer heat if a uniformly dried pelleted product is to be obtained. The automatic regulation of dryer fuel flow as a function of the rate of water addition is described and claimed in the aforementioned related application, and is accomplished in part by a system which includes main fuel supply conduit 36 and valves 38 in subsidiary fuel supply conduits for the dryer burners 27.

It should be obvious to those skilled in the art that there would be no departure from the scope of this invention in substituting for the above-mentioned controller, sensing device, motor valve and transmitters, other controllers, sensing devices, motor valves and transmitters which communicate by means of electrical signaling, hydraulic signaling or any type of signaling other than the pneumatic signaling illustrated as representative. Therefore, it should be understood that the illustrative details set forth herein are merely explanatory in purpose and should not be construed as unnecessarily limiting the invention.

Having described our invention and a specific embodiment thereof we claim:

1. Apparatus for continuously forming carbon black pellets, said apparatus comprising:
   a. means for forming pellets;
   b. carrying means including a conveyer for carrying carbon black powder from a source thereof to said means for forming pellets;
   c. a first transmitter including weighing means associated with said conveyer for weighing the carbon black present on said conveyer and for producing a weight signal which varies in accordance with and is representative of the varying weights of carbon black present on the conveyer;
   d. a water conduit having a discharge outlet stationed adjacent a point on said carrying means downstream from the point where said weighing means is associated with said conveyer for adding water to said carbon black;
   e. a first motor valve in said water conduit;
   f. a second transmitter, including water flow sensing means in said water conduit, for continuously measuring the flow of water in said conduit and for generating a signal representative of the volume rate at which water is being added to the carbon black;
   g. a water/carbon black ratio controller connected with said first and second transmitters and operatively associated with said motor valve to receive signals from said transmitters and to open and close said motor valve as the amount of carbon black on said conveyer varies in order to maintain a predetermined ratio between the weight of carbon black and the flow of water; and
   h. means for drying pellets, including a heat treatment chamber, burners to heat said chamber and a fuel conduit to supply said burners.

2. Automatic control apparatus for a pelletizing apparatus, comprising the combination of:
   a. feeder means for feeding a flow of powdery solids in an unpelletized form at relatively smooth volume rate;

b. a weighing device connected to said feeder means and to said pelletizer for continuously receiving and weighing said relatively smooth flow of powdery material while conveying same to the pelletizer, said weighing device including means for producing a weight signal which varies in accordance with and is representative of varying weights of said powdery solids on the weighing device;

c. a conduit communicating between a source of pelletizing fluid and a point within the interior of said pelletizer downstream from said weighing device for conveying said fluid thereto;

d. valve means in said conduit for regulating the rate of flow of said fluid; and e. ratio control means connected to said weighing device and to said valve means for receiving weight signals from said weighing device and for opening and closing said valve means in response thereto as the weight of powdery solids on said weighing device varies in order to maintain a predetermined ratio between the flows of powdery solids and pelletizing fluid to the pelletizer.

3. Apparatus in accordance with claim 2 wherein said feeder means includes a chamber having a discharge outlet and rotatable means within said chamber for pushing said powdery solids through said chamber and out of said outlet at a relatively smooth rate.

4. Apparatus in accordance with claim 3 wherein said feeder means is a screw conveyor.

5. Apparatus in accordance with claim 4 wherein said screw conveyor comprises flighting, and a portion of said screw is free of flighting for keeping said conveyor full.

6. Apparatus in accordance with claim 4 wherein said feeder means includes a first screw conveyor and a second screw conveyor connected to the first so as to receive the powdery material discharged by the first conveyor, said second conveyor being adapted to rotate at a faster rate than the first conveyor.

7. Apparatus in accordance with claim 1 wherein said weighing device is a weigh belt conveyor.

8. Apparatus in accordance with claim 7 wherein said weigh belt conveyor includes a pneumatic transmitter, said ratio control means is a pneumatic controller and said valve means is a pneumatic motor valve, said transmitter, ratio controller and valve means being connected with one another by pneumatic control air lines.

9. Apparatus in accordance with claim 1 wherein flow sensing means are provided in said conduit for sensing the rate of flow of said fluid in said conduit, and for generating a flow signal representative of the rate of flow of said fluid, said ratio control means being connected to said flow sensing means for receiving said flow signal and for maintaining a predetermined relationship between the flow and weight signals by opening and closing said valve.

* * * * *